US012290890B2

(12) United States Patent
Britton et al.

(10) Patent No.: US 12,290,890 B2
(45) Date of Patent: May 6, 2025

(54) AUTOMATED FLOATING INSERTION TOOL FOR PUSH-IN FASTENERS

(71) Applicant: Doben Limited, Windsor (CA)

(72) Inventors: Simon Britton, Windsor (CA); Larry Koscielski, Lasalle (CA)

(73) Assignee: DOBEN LIMITED, Windsor (CA)

( * ) Notice: Subject to any disclaimer, the term of this patent is extended or adjusted under 35 U.S.C. 154(b) by 0 days.

(21) Appl. No.: 18/727,418

(22) PCT Filed: Feb. 16, 2023

(86) PCT No.: PCT/CA2023/050201
§ 371 (c)(1),
(2) Date: Jul. 9, 2024

(87) PCT Pub. No.: WO2024/168417
PCT Pub. Date: Aug. 22, 2024

(65) Prior Publication Data
US 2025/0100093 A1 Mar. 27, 2025

(51) Int. Cl.
| B23P 19/06 | (2006.01) |
| B21J 15/10 | (2006.01) |
| B21J 15/32 | (2006.01) |
| B23Q 16/00 | (2006.01) |
| B25J 11/00 | (2006.01) |

(52) U.S. Cl.
CPC ............. *B23P 19/062* (2013.01); *B21J 15/10* (2013.01); *B21J 15/32* (2013.01); *B23Q 16/003* (2013.01); *B25J 11/007* (2013.01)

(58) Field of Classification Search
CPC .......... B23P 19/062; B21J 15/10; B21J 15/32; B25J 11/007; B23Q 16/003
See application file for complete search history.

(56) References Cited

U.S. PATENT DOCUMENTS

| 1,817,584 | A | | 8/1931 | Rosenberg |
| 5,271,686 | A | * | 12/1993 | Herring, Jr. ............ B21J 15/10 |
| | | | | 901/29 |

(Continued)

FOREIGN PATENT DOCUMENTS

| CN | 106994683 A | 8/2017 |
| JP | S6062428 A | 4/1985 |

(Continued)

OTHER PUBLICATIONS

International Search Report and Written Opinion for International Application No. PCT/CA2023/050201 mailed Oct. 19, 2023.

*Primary Examiner* — Ryan J. Walters
(74) *Attorney, Agent, or Firm* — Carlson, Gaskey & Olds, P.C.

(57) ABSTRACT

A method of installing a push-in fastener includes the steps homing a floating tool assembly to a home position, the floating tool assembly carries a locating pin and a punch, releasing the floating tool assembly, positioning a workpiece at a target position, retrieving a fastener with the punch, engaging the workpiece with the locating pin which causes the floating tool assembly to move to a desired working position with respect to the workpiece, locking the floating tool assembly in the desired working position, retracting the locating pin, and advancing the punch to install the fastener in the workpiece.

20 Claims, 15 Drawing Sheets

(56) References Cited

U.S. PATENT DOCUMENTS

| | | |
|---|---|---|
| 5,850,687 A | 12/1998 | Ito |
| 6,944,944 B1 | 9/2005 | Craythorn et al. |
| 7,100,260 B2 | 9/2006 | Savoy et al. |
| 10,471,549 B2 | 11/2019 | Koscielski et al. |
| 11,273,485 B2 * | 3/2022 | Moriniere ............. B23P 19/102 |
| 11,883,908 B2 * | 1/2024 | Koscielski ............. B65G 19/02 |
| 2021/0054867 A1 | 2/2021 | Buczynski |

FOREIGN PATENT DOCUMENTS

| | | |
|---|---|---|
| JP | S60217028 A | 10/1985 |
| JP | H05200638 A | 8/1993 |
| JP | H07185952 A | 7/1995 |
| JP | H07185957 A | 7/1995 |
| JP | H07185958 A | 7/1995 |
| WO | 2006127288 A2 | 11/2006 |

\* cited by examiner

AUTOMATED FLOATING INSERTION TOOL FOR PUSH-IN FASTENERS

TECHNICAL FIELD

The disclosure relates to an automated insertion tool for push-in fasteners.

BACKGROUND

Push-in fasteners, typically nuts, are formed sheet metal components that employ features or elements to engage with workpiece to hold it captive and resist turning during subsequent installation of a mating bolt or screw. There are a number of terms used to describe these nut-style fasteners, such as: box nuts, push nuts, push-nuts, push-in nuts, pushin nuts, clip-nuts, expansion nuts, and snap-in nuts. These fasteners are different than Rivnuts® or clinch nuts, where permanent deformation is used to interlock the fastener and workpiece.

The features of push-in fasteners are resilient to permanent deformation when forced aside by the edges of the retaining hole during insertion into the workpiece. A common attribute of push-in fasteners, not particularly relevant to the insertion process, is that the mating fastener engages a feature of the push-in fastener during installation to prevent the fastener from pulling back out.

The minimum push-in fastener installation force will result when the installation force is applied approximately perpendicular to the surface of the workpiece at the installation site. And for that reason, coincident with the axis of the mating bolt or screw fastener. The installation force for some light duty push-in fasteners can be low enough for that they can be installed using light finger pressure and having only single-side access to the workpiece. Large and high-load fasteners may require the workpiece to be backed-up with an anvil to resist the required high installation force and ensure the workpiece is not damaged or distorted.

Push-in fasteners usually incorporate a reduced size or feature to facilitate initial engagement before the alignment becomes increasingly restricted during assembly. While the lead is beneficial to aligning the fastener with the mating how, it is usually minimized to optimize the length and mass of the push-in fastener. If the push-in fastener is misaligned to the receiving hole, it may tip and prevent proper assembly, or it may be permanently deformed and damaged.

Because the push-in fastener is commonly installed into a thin sheet metal workpiece, alignment is critical to prevent damage to the workpiece. Push-in fasteners may be manually inserted into structural metal components by production personnel. Manually locating the receiving hole before visually orienting and manually inserting the fastener is tedious, repetitive and demanding work. Therefore, to maintain productivity and quality, automation is often preferred.

Automation-based solutions typically require a customized fixture to accurately position the assembly so a robot can place the fastener into the receiving hole. Supplemental visual, position, or force sensor(s) may be used to provide position adjustment feedback to the robot but, they are complex to program and maintain. The sensing and position adjustment steps may also add considerably to the overall cycle time.

SUMMARY

In one exemplary embodiment, a method of installing a push-in fastener includes the steps homing a floating tool assembly to a home position, the floating tool assembly carries a locating pin and a punch, releasing the floating tool assembly, positioning a workpiece at a target position, retrieving a fastener with the punch, engaging the workpiece with the locating pin which causes the floating tool assembly to move to a desired working position with respect to the workpiece, locking the floating tool assembly in the desired working position, retracting the locating pin, and advancing the punch to install the fastener in the workpiece.

In a further embodiment of any of the above, the floating tool assembly includes a first plate, the homing step includes locking a first plate to a fixed structure, and the releasing step includes unlocking the first plate from the fixed structure.

In a further embodiment of any of the above, the positioning step includes moving a workpiece beneath the floating tool assembly with a multi-axis robot. The home position corresponds to a hole in the workpiece being arranged in alignment with the locating pin.

In a further embodiment of any of the above, the floating tool assembly includes a slide assembly that supports the locating pin and the punch. The retrieving step includes advancing the punch to pick up a fastener from a chute with the slide in a first position.

In a further embodiment of any of the above, the engaging step includes advancing the locating pin to engage the hole with the slide assembly in the first position which causes the floating tool assembly to move laterally relative to a fixed structure to a centered position that is offset from the home position that corresponds to the desired working position.

In a further embodiment of any of the above, the engaging step is performed prior to the retrieving step.

In a further embodiment of any of the above, the locking step includes actuating a brake assembly. The locking step includes locking a first plate to the fixed structure in the centered position.

In a further embodiment of any of the above, the method includes the step of moving the slide assembly from the first position to a second position. The moving step is performed between the locating pin retracting step and the punch advancing step.

In a further embodiment of any of the above, the advancing step inserts the fastener into the hole previously engaged by the locating pin.

In a further embodiment of any of the above, the method includes the step of unlocking the floating tool assembly and performing the homing step in preparation for another push-in fastener installation.

In another exemplary embodiment, a fastener insertion tool for inserting a push-in fastener into a hole in a workpiece includes a fixed structure, a floating tool assembly that is movably supported on the fixed structure and configured to move between a home position and a desired working position, a homing assembly that is configured to locate the floating assembly relative to the fixed structure in the home position, a brake assembly that is configured to move between locked and unlocked positions, the floating tool assembly is permitted to move relative to the fixed structure in the locked position, and the floating tool assembly is affixed to the fixed structure in the locked position with the floating tool assembly in the desired working position. A slide assembly is movable between first and second positions, the slide assembly supports a locating pin that is movable between retracted and extended positions. The extended position corresponds to the locating pin being received in the hole in the workpiece with the slide assembly in the first position. The locating pin being received in the hole urges the floating assembly to move to the desired working position. A punch is movable between retracted and extended positions, the punch is configured to support the push-in fastener. The extended position corresponds to the push-in fastener being received in the hole in the workpiece with the slide assembly in the second position.

In a further embodiment of any of the above, the fastener insertion tool includes a pair of spaced apart linkages that interconnect the floating tool assembly to the fixed structure. The linkages are configured to permit the floating tool assembly to freely move laterally in a plane between the home position and the desired workpiece position.

In a further embodiment of any of the above, the homing assembly includes a homing actuator that is mounted on the fixed structure and configured to linearly actuate a tapered body between engagement and disengagement with a correspondingly tapered hole in the floating tool assembly.

In a further embodiment of any of the above, the brake assembly includes a brake actuator that is mounted on the fixed structure and configured to linearly actuate a puck between engagement and disengagement with a friction surface on the floating tool assembly.

In a further embodiment of any of the above, the slide assembly includes a set of rails and a slide plate is slidably supported on the rails for movement between the first and second positions.

In a further embodiment of any of the above, the fastener insertion tool includes a locating pin actuator that is configured to linearly move the pin between the extended and retracted positions. The locating pin actuator is mounted on the slide plate.

In a further embodiment of any of the above, the fastener insertion tool includes a punch actuator that is configured to linearly move the punch between a loading position and the extended and retracted positions. The punch actuator is mounted on the slide plate. The loading position corresponds to the punch picking up the push-in fastener from a chute.

In a further embodiment of any of the above, the locating pin has a tapered end that is configured to urge the floating tool assembly to move laterally to a centered position with respect to the hole in response to the tapered end sliding along the periphery of the hole.

In another exemplary embodiment, a fastener insertion cell that includes the fastener insertion tool, the fastener insertion cell includes a multi-axis robot that is configured to move a workpiece to a target position, a first conveyor that is configured to provide the workpiece to the robot, a second conveyor that is configured to receive the workpiece from the robot subsequent to insertion of the push-in fastener into the hole, and a vibratory tumbler that is configured to feed push-in fasteners to the punch via a chute.

In a further embodiment of any of the above, the robot maintains the workpiece in the target position as the locating pin engages the hole, which causes a lateral reaction force to move the floating tool assembly to a centered position in which the punch is subsequently aligned with the hole in the desired workpiece position.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
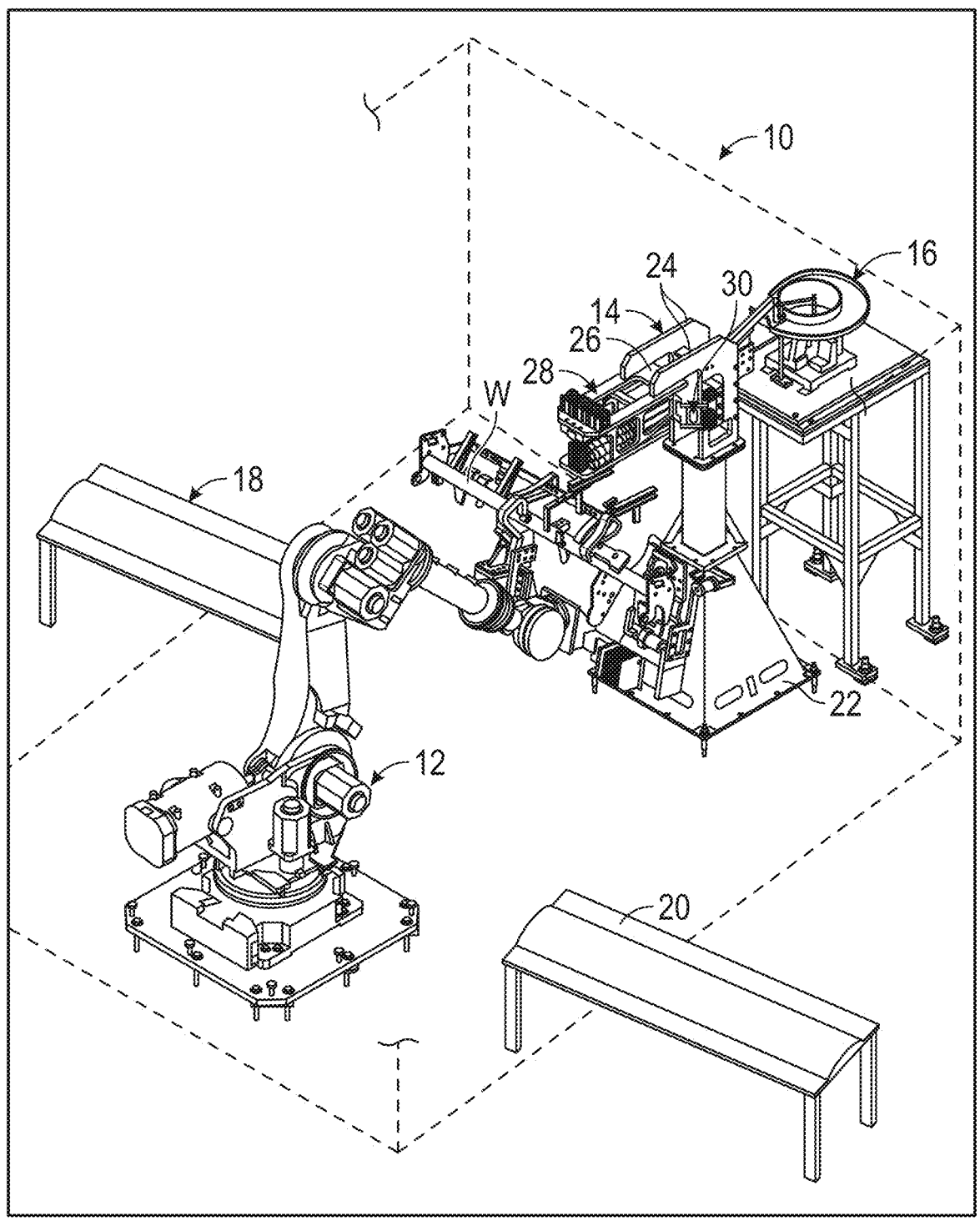
FIG. 1 is perspective view of an example automated fastener insertion cell with a fastener insertion tool.

FIG. 1 schematically illustrates an automated fastener insertion cell 10. The dashed lines schematically indicate the safety fencing that is typically used to cordon off the cell from workers. A multi-axis robot 12, for example, picks up a workpiece W from a first conveyor 18, which is fed parts by a worker outside of the cell. The robot 12 positions the workpiece W to a target position at a fastener insertion tool 14, which is fed fasteners from a vibratory tumbler 16, for example. The target position corresponds to a location of a hole in the workpiece W being aligned with a punch on the fastener insertion tool 14 that will subsequently insert the push-in fastener into the hole.

The fastener insertion tool 14 inserts one or more push-in type fasteners into one or more apertures in the workpiece W. If the workpiece W requires multiple push-in fasteners, the robot 12 will move the workpiece W between multiple target positions. Once the various operations on the workpiece W have been completed, the robot 12 moves the workpiece W to a second conveyor 20, which moves the workpieces out of the cell 10 for retrieval by a worker. It should be understood that the cell 10 may be configured differently than described.

The robot 12 can be for example a 6-axis industrial robot, or if the workpiece is relatively flat, a Cartesian or SCARA robot. The robot 12 may manipulate the workpiece since one simple configuration of the fastener insertion tool 14 is achieved when its plane of motion is parallel to the floor so there is no requirement to compensate for the force of gravity. In this configuration, the robot 14 is free to orient the workpiece to different orientations, planes, and positions.

Figure 2A:
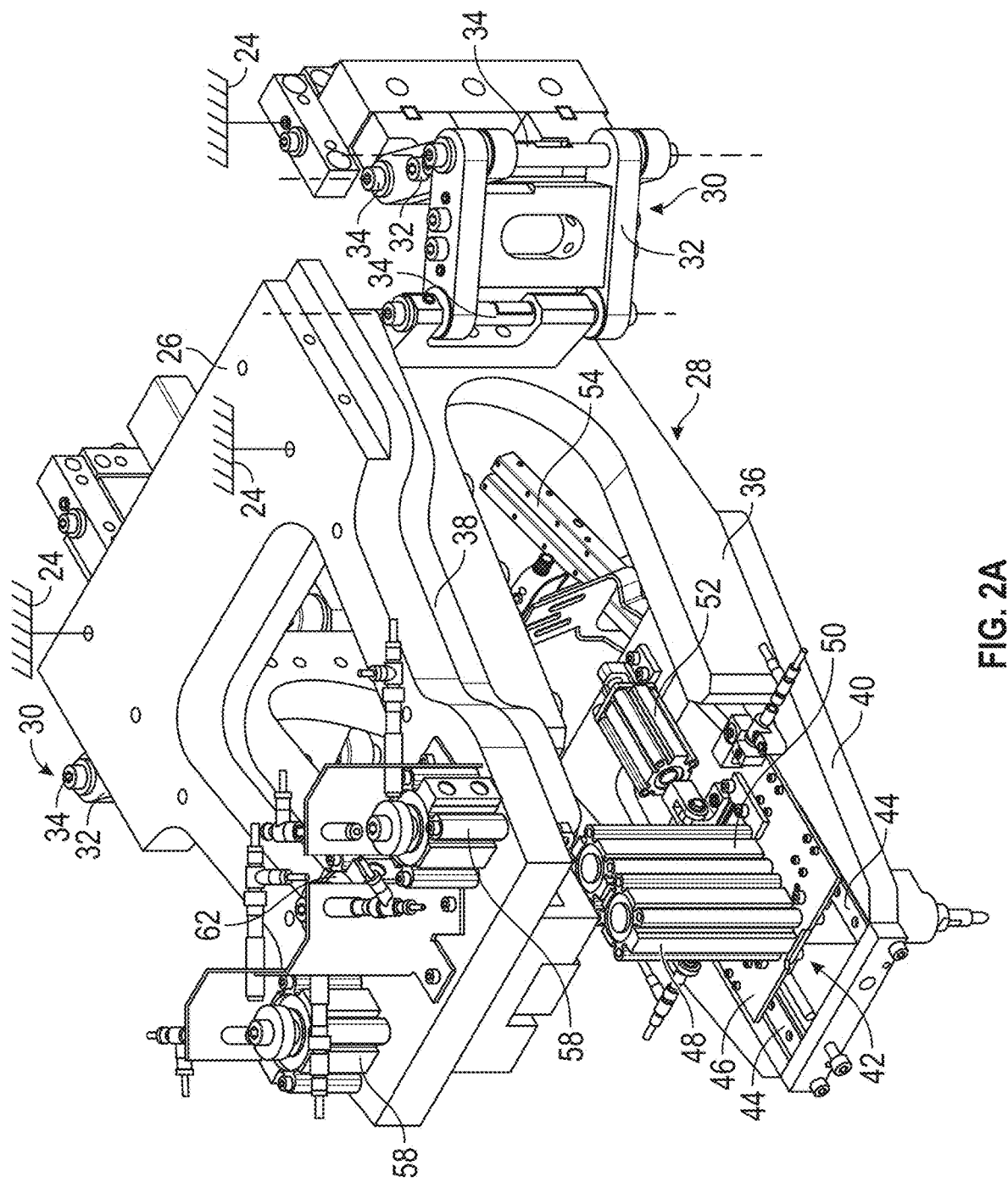
FIGS. 2A and 2B are respectively top and bottom perspective views of a floating tool assembly of fastener insertion tool shown in FIG. 1.
Figure 2B:
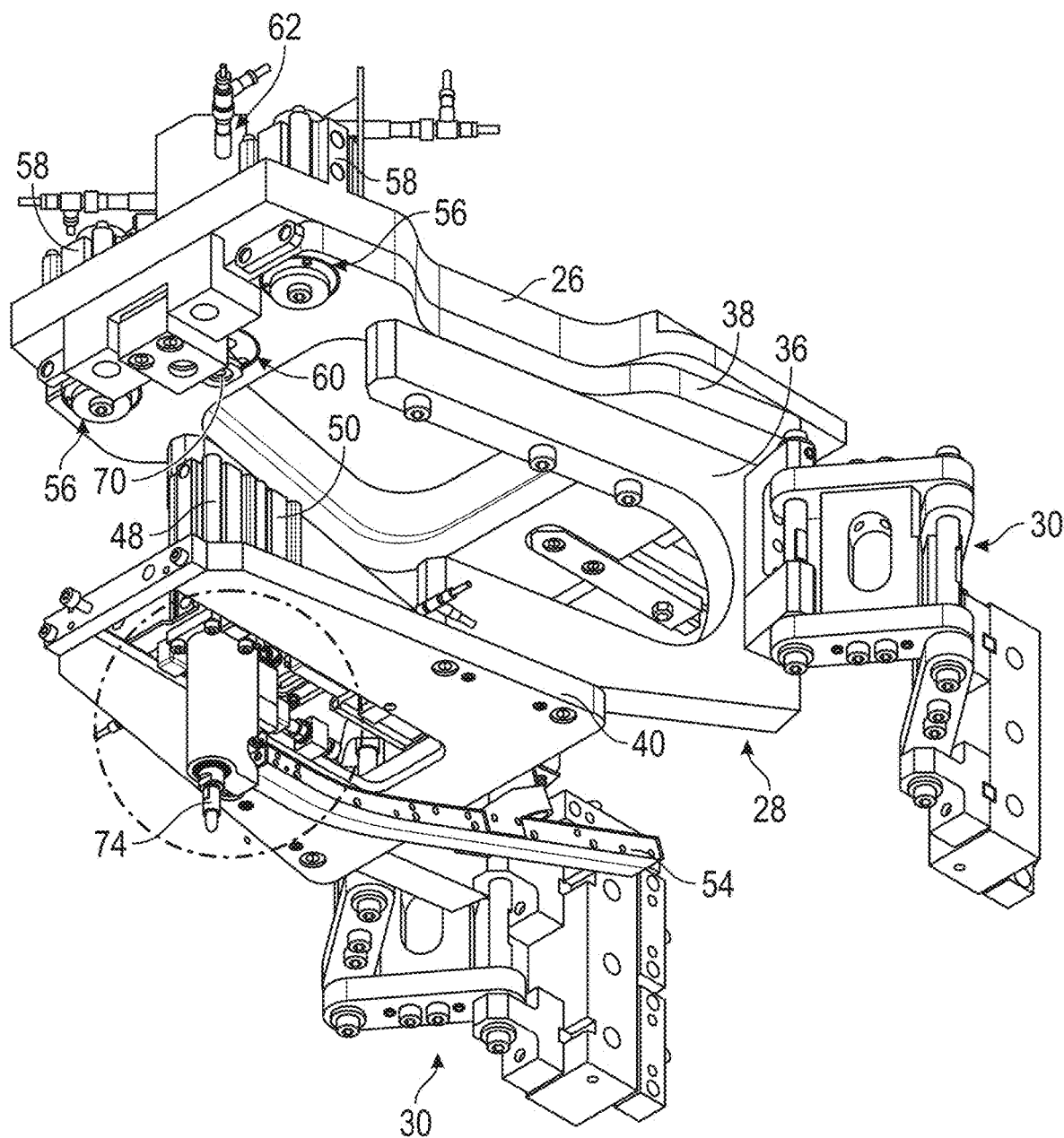

With continuing reference to FIG. 1, the fastener insertion tool 14 includes a fixed structure provided by a pedestal 22 supporting a fixed plate 26 via brackets 24. A floating tool assembly 28 is mounted to the fixed structure (e.g., the brackets 24) by linkages 30. Referring to FIGS. 2A-2B, the linkages 30 are arranged on either side of the floating tool assembly 28 and each include multiple arms 32 secured to one another by pins 34 that provide pivotal connections such that the floating tool assembly 28 may "float" laterally relative to the fixed plate 26 during certain steps in the fastener insertion process. However, some operations are performed with the floating tool assembly 28 locked to or affixed to the fixed plate 26 such that it cannot move laterally. The linkages 28 or other mechanism that maintains the plane of floating tool assembly 28 movement approximately orthogonal to the fastener inserting operating axis (e.g., actuation axis of punch 92)

In the example shown, the floating tool assembly 28 is arranged beneath the fixed plate 26 and can float in a horizontal plane freely when unlocked relative to the fixed structure. The floating tool assembly 28 includes first and second plates 38, 40 that are vertically spaced apart from one another and secured to one another by laterally spaced apart mounting plates 36.

Figure 10:
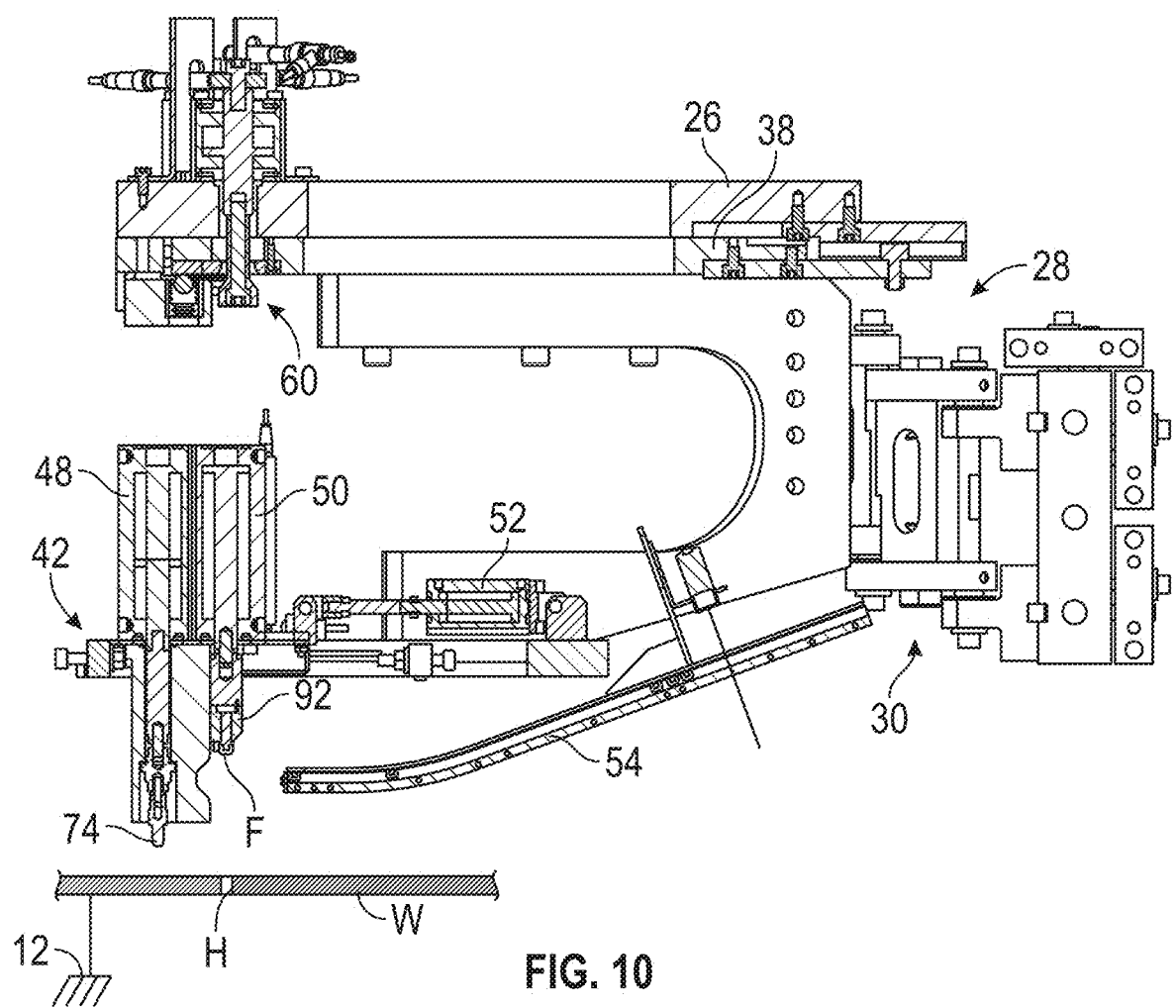
FIG. 10 illustrates the floating tool assembly with the slide in a second position, the locating pin in the retracted position, and the punch with a fastener and in the retracted position.
Figure 11:
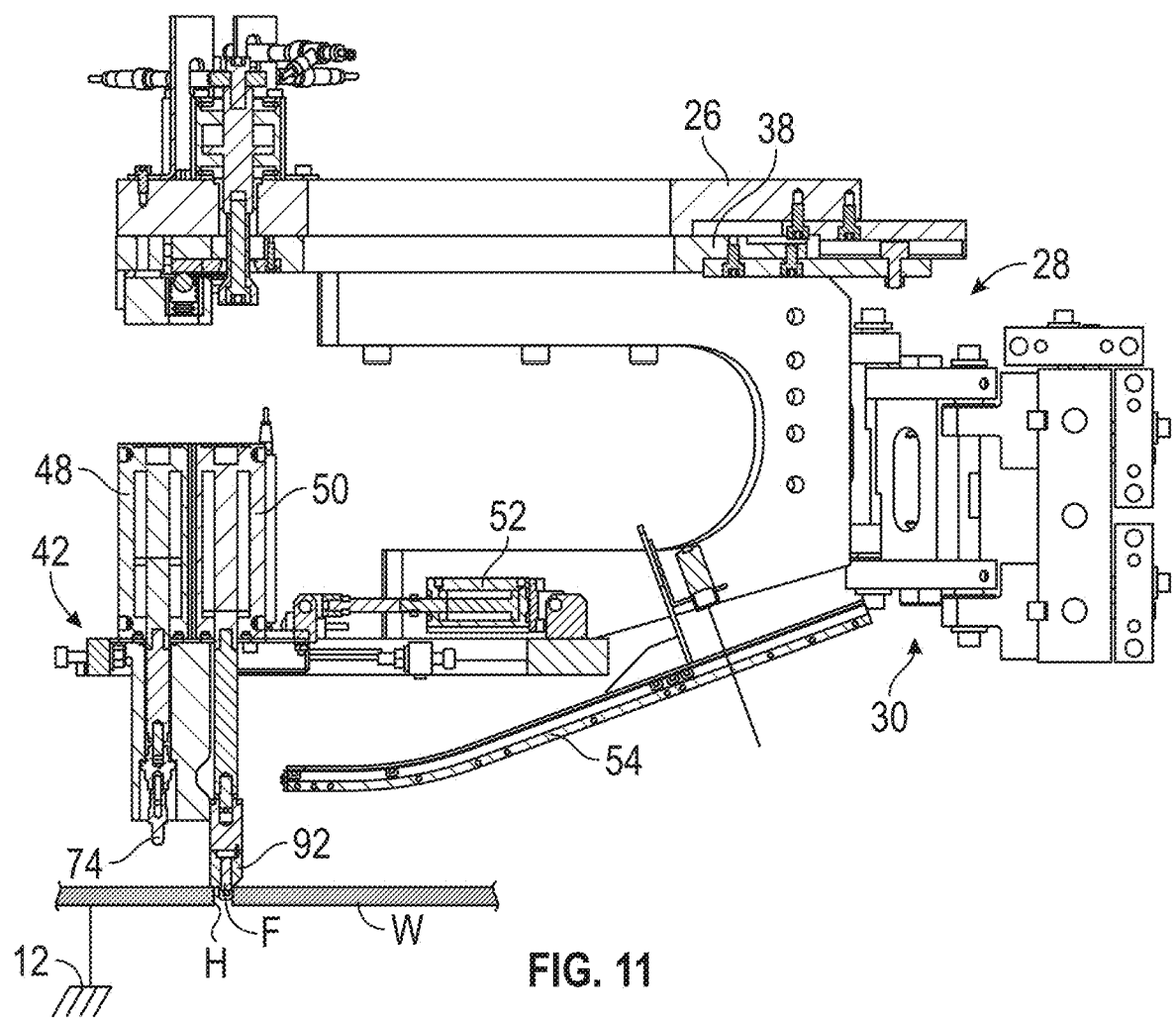
FIG. 11 depicts the floating tool assembly with slide in the second position, the locating pin in the retracted position, and the punch in the extended position.

A slide assembly 42 is supported on the second plate 40. The slide assembly 42 includes a slide plate 46 movably supported along horizontal rails 44 in response to actuation by a slide actuator 52 interconnected between the slide plate 46 and the second plate 40. A vertically arranged locating pin actuator 48 and punch actuator 50 are mounted on the slide plate 46. The slide actuator 52 is configured to move the slide plate 46, and thus the locating pin actuator 48 and punch actuator 50 between first and second positions (actuator retracted and actuator extended, respectively). In the first position, the punch 92 is aligned with a fastener F to be picked up in the chute (FIGS. 8 and 9), and the locating pin 74 is aligned with the hole in the workpiece W. In the second position, the punch 92 and its supported fastener F is aligned with the hole in the workpiece W (FIGS. 10 and 11).

Figure 3A:
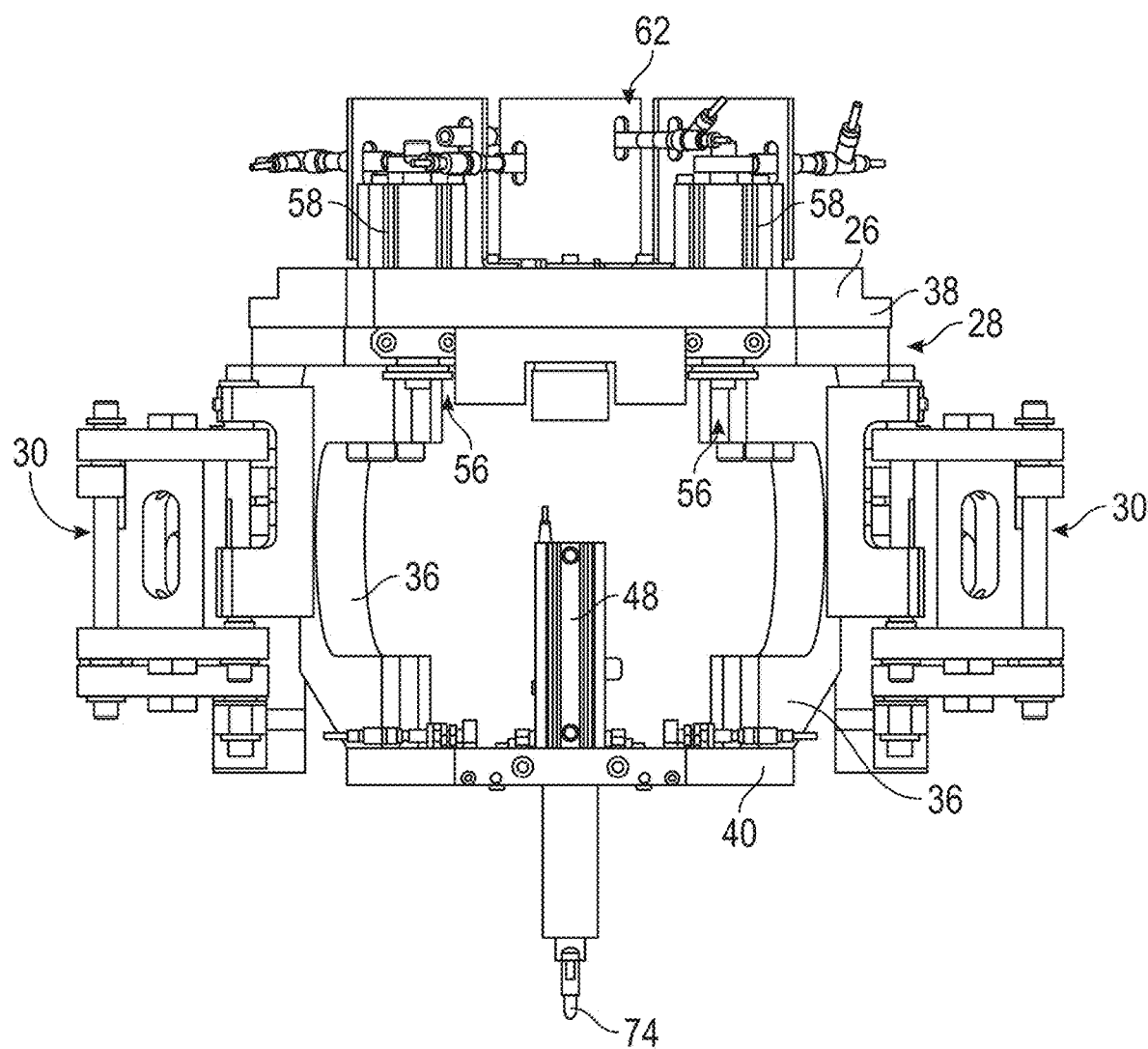
FIGS. 3A-3C are respectively front, top and side views of the floating tool assembly shown in FIGS. 2A-2B.
Figure 3B:
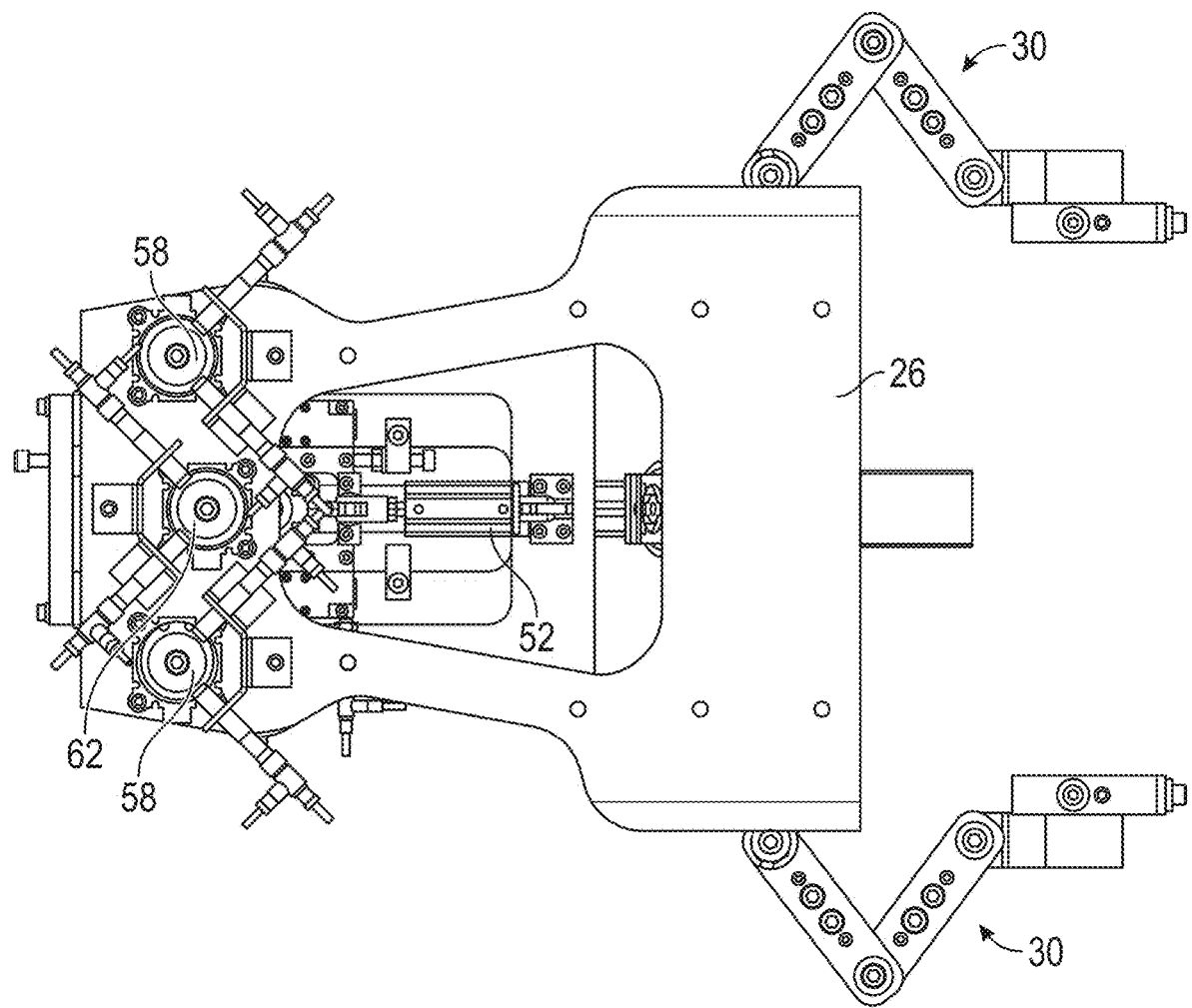
Figure 3C:
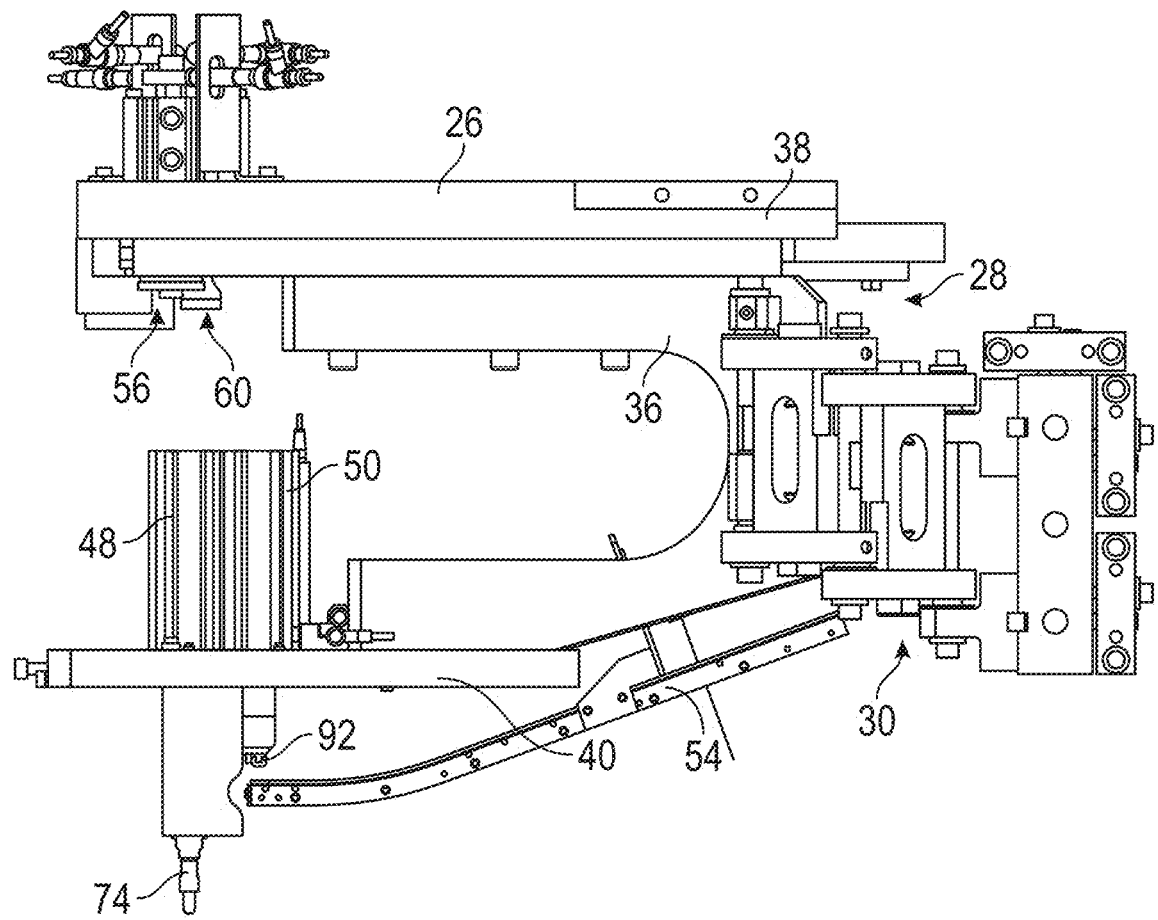
Figure 5:
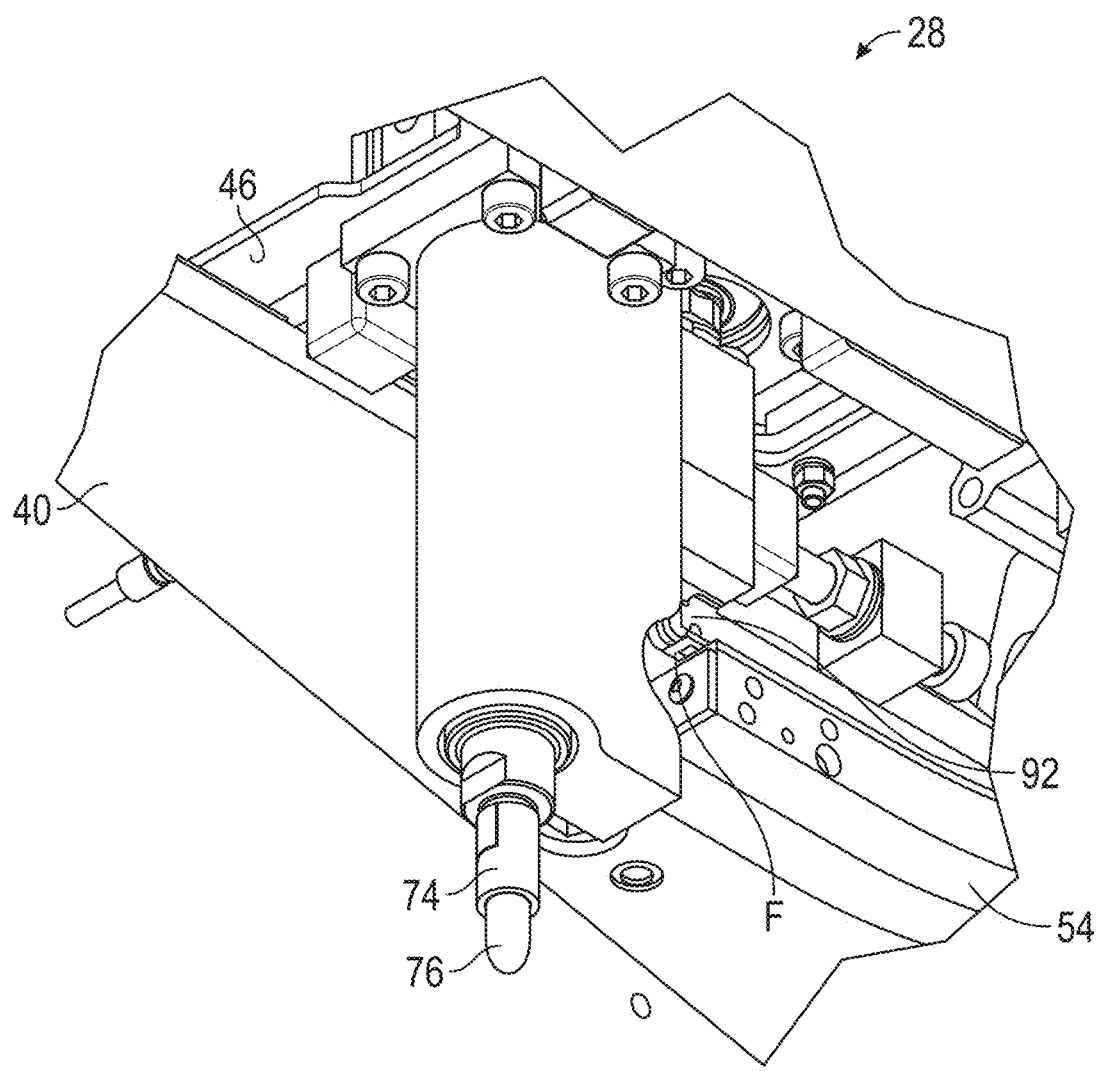
FIG. 5 is an enlarged bottom perspective view of a locating pin used to locate the floating tool assembly relative to a workpiece.
Figure 8:
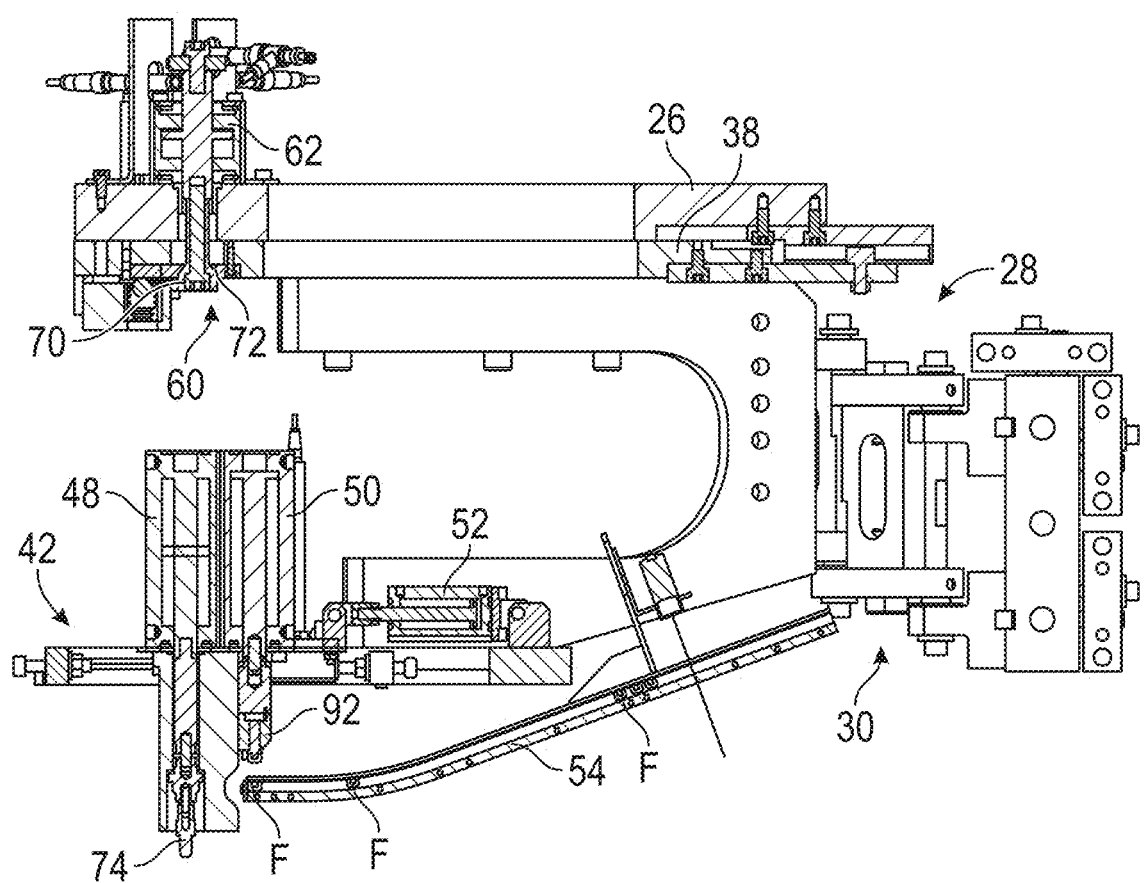
FIG. 8 illustrates the floating tool assembly locked in the home position with the locating pin and the punch both in the retracted position and with the slide in a first position.
Figure 9:
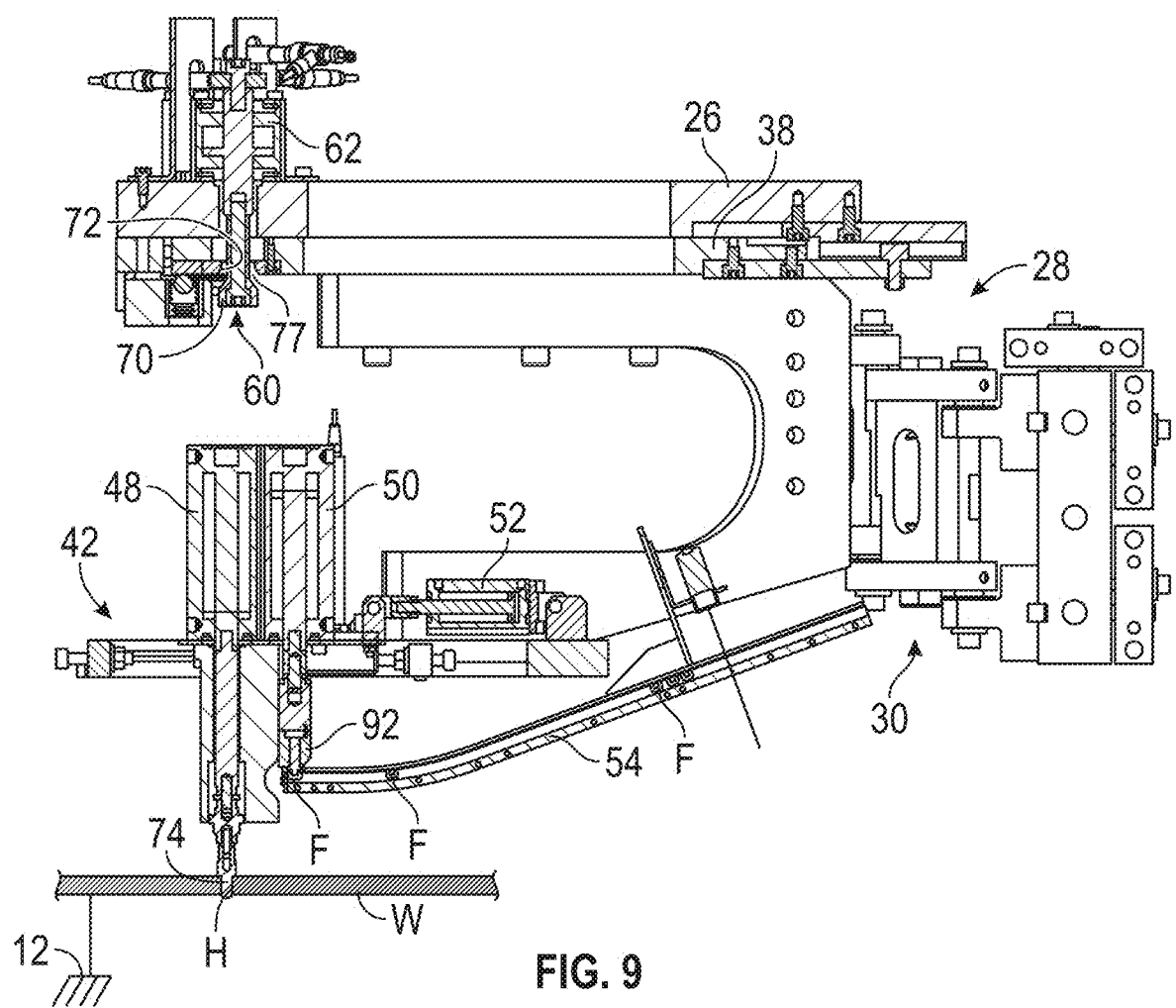
FIG. 9 depicts the floating tool assembly with the slide in the first position, the locating pin in the extended position, and the punch in a fastener loading position.

Referring to FIGS. 2B, 3C and 5, the punch 92 is configured to pick up a push-in fastener F from a chute 54 when the punch 92 is actuated by the punch actuator 50 from a retracted position (FIG. 8) to a loading position (FIG. 9).

Figure 4A:
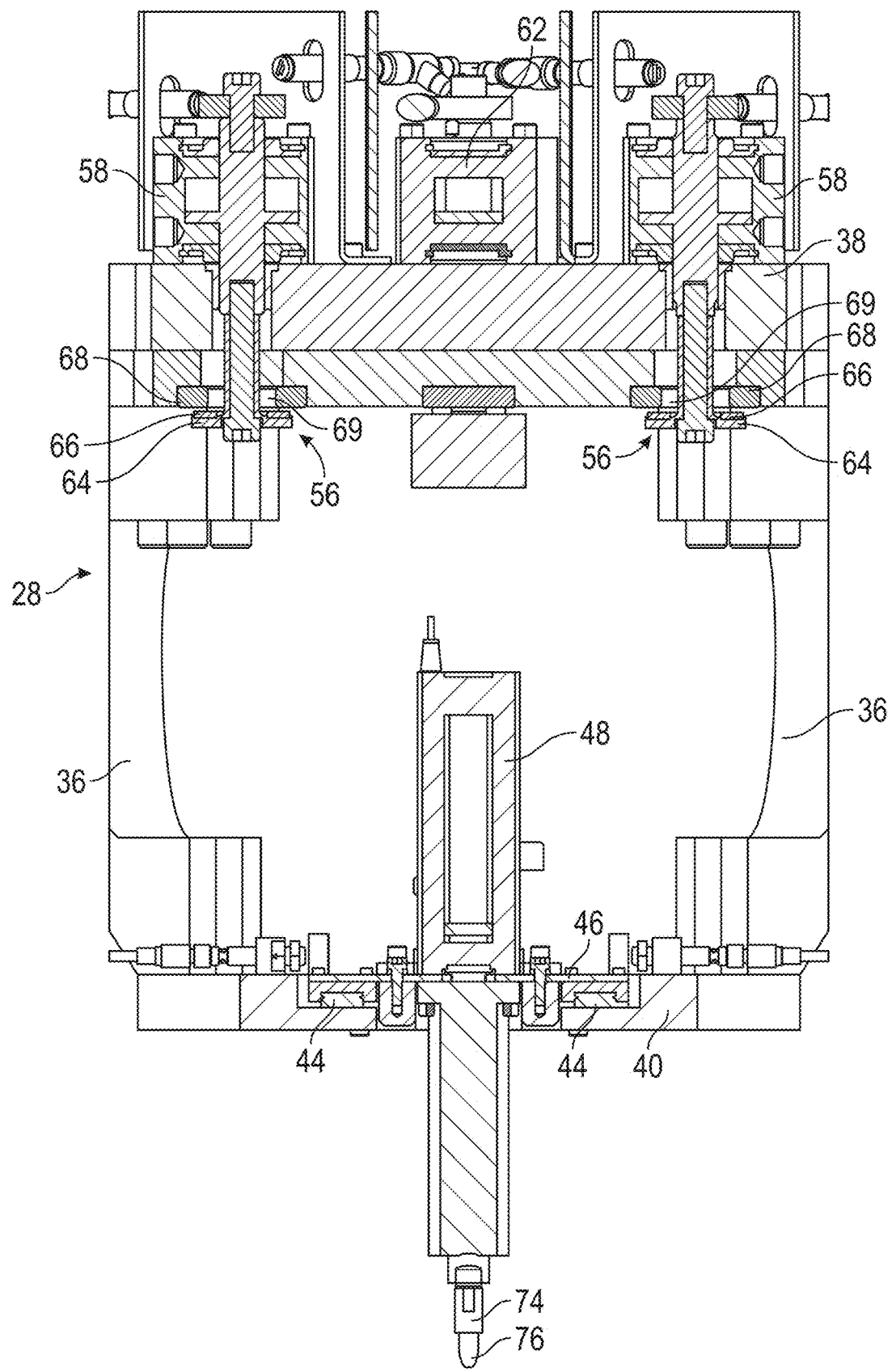
FIGS. 4A and 4B are front views of the floating tool assembly respectively illustrating the brakes in unlocked and locked positions.
Figure 4B:
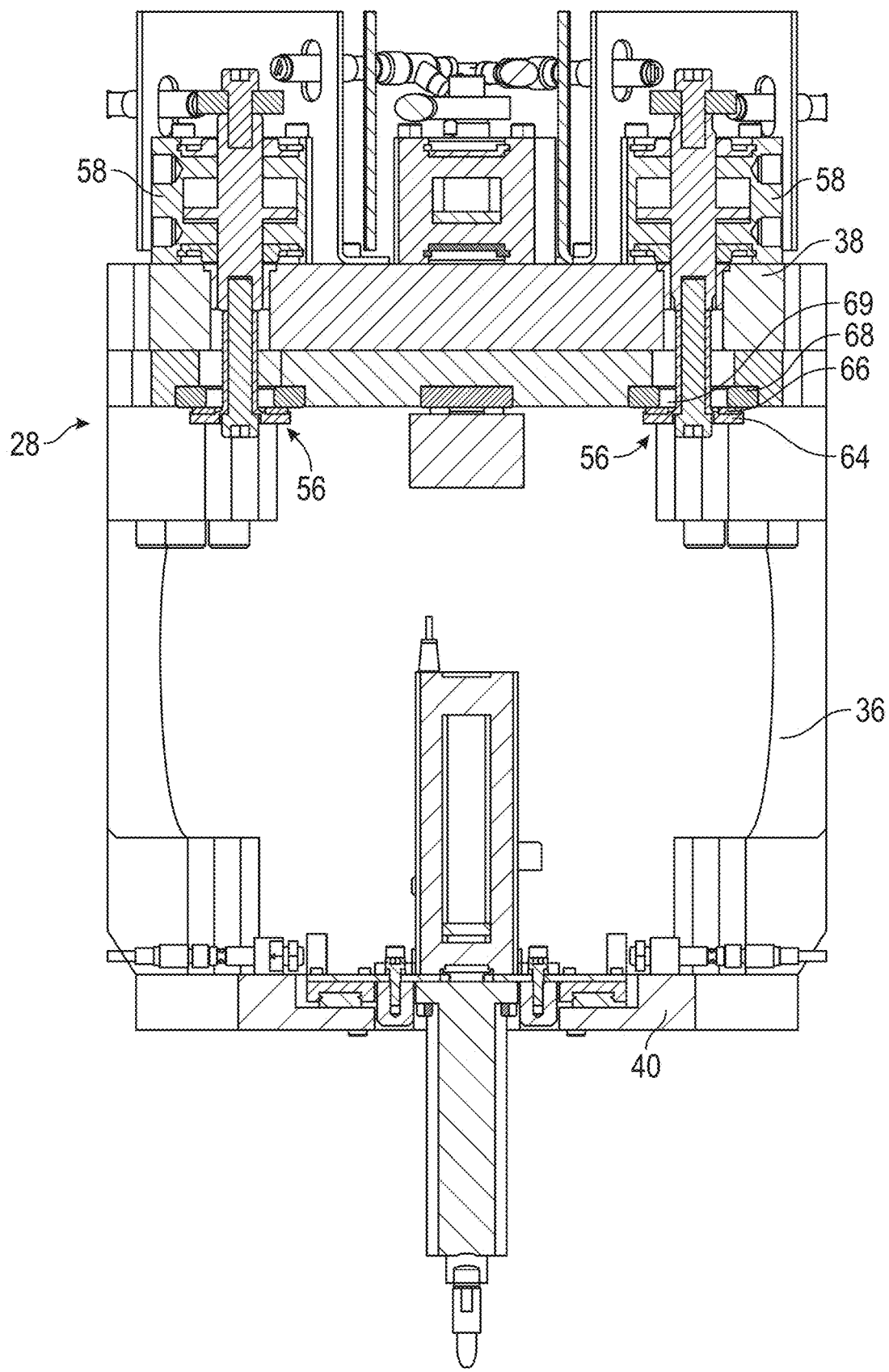

Referring to FIGS. 3A-4B, a pair of brake assemblies 56 are mounted between the fixed plate 26 and the first plate 38 to lock (FIG. 4B) and unlock (FIG. 4A) these plates relative to one another in response to actuation of brake actuators 58, which are mounted to the fixed plate 26. Each brake assembly 56 includes a brake puck 64 having a friction surface 66 that engages with a brake ring 68 on the first plate 38 to lock the floating tool assembly 28 to the fixed structure, as shown in FIG. 4B. With the brake assembly in the unlocked position, as shown in FIG. 4A, the friction surface 66 is spaced from the brake ring 68. In the unlocked position, the floating tool assembly 28 is allowed to move laterally relative to the fixed plate 26 due to the radial clearance 69 provided between the rod of the brake actuator 58 and the hole in the fixed plate 26 through which the rod extend.

A homing assembly 60 includes a homing actuator 62 mounted to the fixed plate 38. The homing assembly 60 includes a tapered body 70 mounted to an end of the actuator's rod (see, FIG. 2B). The tapered body 70 selectively cooperates with a tapered hole 72 in the first plate 38. When the tapered body 70 is unengaged or spaced apart from the tapered hole 72 in an unlocked position (see, FIG. 3C), the floating tool assembly 28 is permitted to move laterally with respect to the fixed plate 26 due to a radial clearance 77 between the tapered body and hole 70, 72. The tapered body and hole 72 also include flats or other locating features that engage one another when the tapered body 70 is retracted and seated within the tapered hole 72 in a locked position, and which clock the floating tool assembly 28 relative to the fixed plate 26.

Figure 6:
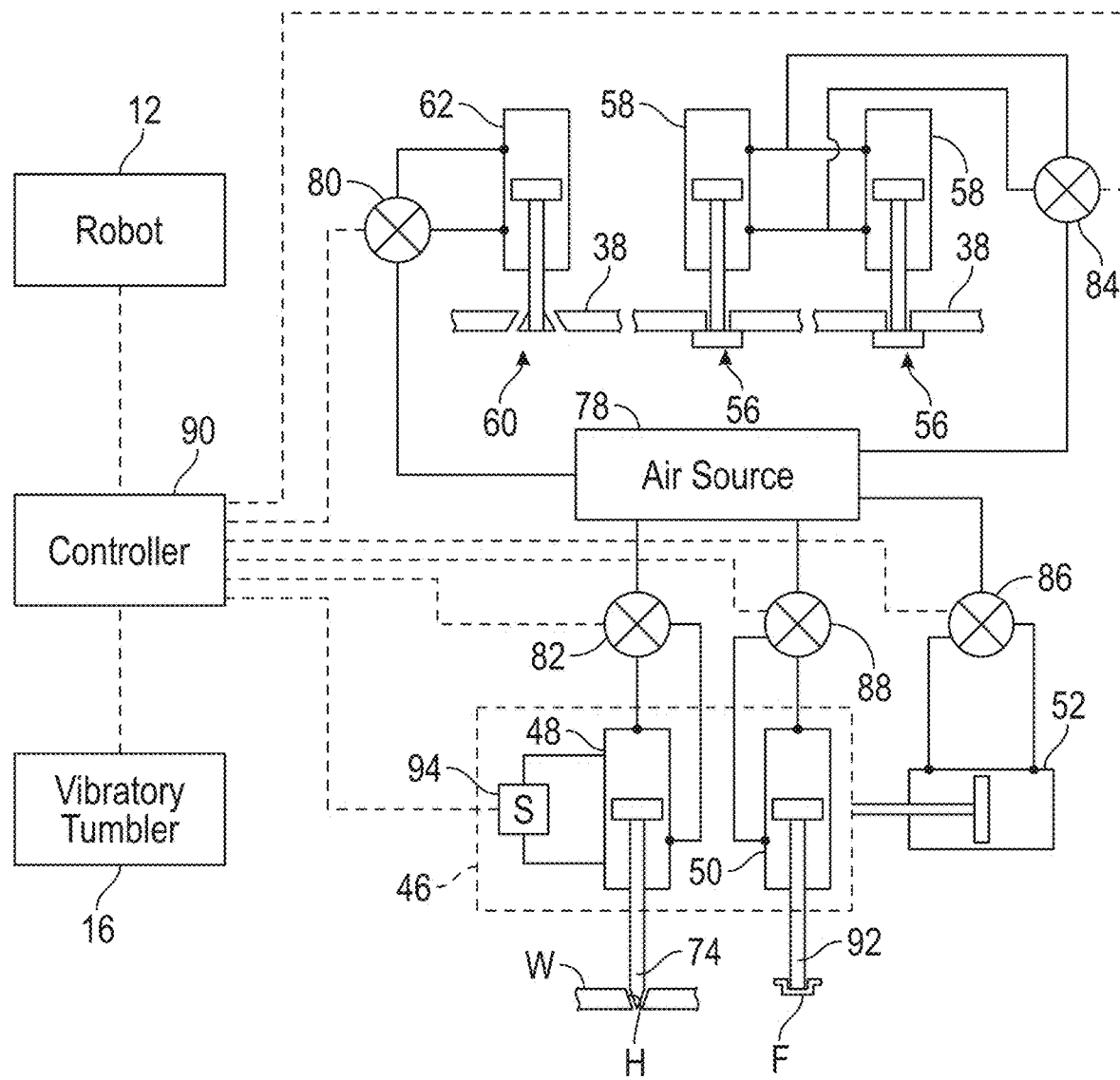
FIG. 6 is a schematic of the fastener insertion cell with a pneumatic system used to operate the floating tool assembly.

An exemplary pneumatic system is schematically shown in FIG. 6. In the example, the actuators 48, 50, 52, 58 and 62 are two-way pneumatic cylinders, which include a rod secured to a piston, and which supports its corresponding end effector (i.e., locating pin 74, punch 92, brake assembly 56, homing assembly 60). Other configurations may be used. An air source 78 is fluidly connected to first, second, third, fourth and fifth pneumatic valves 80, 82, 84, 86, 88, which selectively extend and retract its corresponding actuator 48, 50, 52, 58 and 62. It should be understood that fewer or more valves may be used than shown and the plumbing of those valves is for illustrative purposes only. The valves 80-88 are in communication with a controller 90, which may also control the robot 12, vibratory tumbler 16 and/or other components of the cell 10.

It should be noted that a controller 90 can be used to implement the various functionality disclosed in this application. The controller 90 may include one or more discrete units. Moreover, a portion of the controller 90 may be provided in the cell 10, while another portion of the controller 90 may be located elsewhere. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 90 may be a hardware device for executing software, particularly software stored in memory. The controller 90 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, macroclimate device, microclimate device, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 90 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

With continuing reference to FIG. 6, it may be desirable to include one or more sensors to monitor the actual position of an end effector relative to the commanded position. For example, a sensor 94, such as an LVDT, may be connected to the locating pin actuator 48 to provide pin position feedback to the controller for sequencing the punch, slide, brake and/or homing actuators 48, 52, 58, 62, for example.

Figure 7:
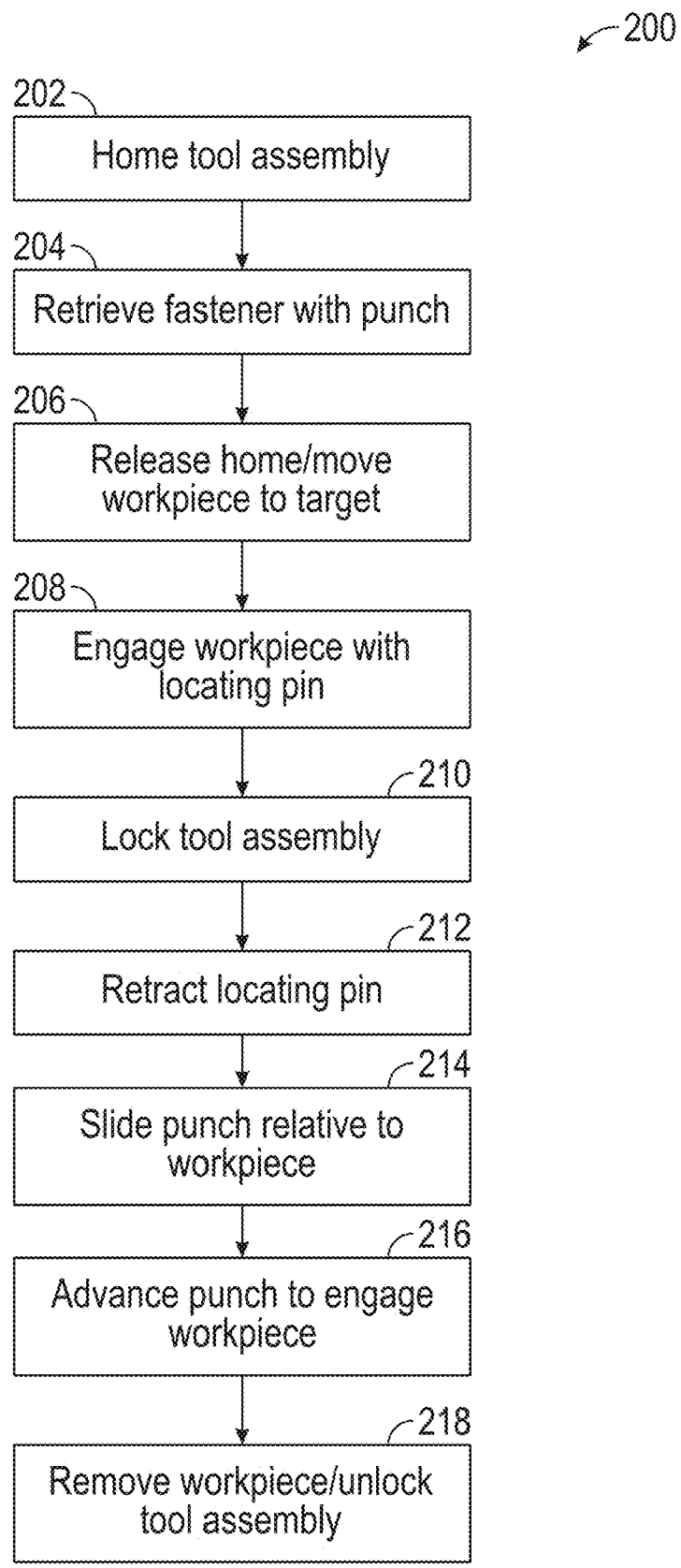
FIG. 7 is a flowchart depicting an example method of operating the automated fastener insertion cell.

Referring to FIG. 7, in connection with FIGS. 8-11, an example flowchart is depicted of a method of installing the push-in fastener. It should be understood that although the steps are shown as being sequential, many of these steps can be performed simultaneously or in a different order than illustrated.

The method 200 includes homing the floating tool assembly 28 (block 202) to affix the floating tool assembly 28 in a centered position relative to the fixed structure (e.g., fixed plate 26), which enables the robot 12 to repeatedly and predictably place the workpiece W and its hole H in a target position with respect to the locating pin 74. However, there is sufficient variation in such a process, which can lead to improperly installed or partially installed push-in fasteners. The disclosed floating tool assembly 28 overcomes such misalignments.

FIG. 8 illustrates the homing actuator 62 retracted, which seats the tapered body 70 in the correspondingly tapered bore, thus affixing the floating tool assembly 28 to the centered position with respect to the fixed plate 26. In this centered position, the locating pin 74 is in a retracted position by the locating pin actuator 48 to provide space for the workpiece W to be positioned beneath the slide assembly 42 in the first position. The punch actuator 50 is in the retracted position such that the punch 92 is immediately above the chute 54 and ready to pick up a fastener F.

Transitioning from FIG. 8 to FIG. 9, the method 200 includes retrieving the fastener F with the punch 92 (block 204) by moving the punch 92 from the retracted position (FIG. 8) to the loading position (FIG. 9). The punch 92 is returned to the retracted position once the fattener F has been retrieved. The homing assembly 60 is released or unlocked (block 206), with the workpiece W is moved to the target position by the robot 12. During this time, the brake assemblies 56 are also unlocked (FIG. 4A).

The locating pin actuator 48 moves the locating pin 74 from the retracted position (FIG. 8) to the extended position (FIG. 9), which engages the hole H of the workpiece W with the locating pin 74 (block 208). Due to the tapered end 76 of the locating pin 74, the floating tool assembly 28 is urged to move laterally to a centered position with respect to the hole H in response to the tapered end 76 sliding along the periphery of the hole H. Said another way, because the robot 12 remains motionless during this step and maintains the workpiece W in the target position as the locating pin 74 engages the hole H, a lateral reaction force occurs that moves the floating tool assembly 28 to the centered position. The steps 204, 206 and 208 may occur sequentially, simultaneously and/or in a different order than illustrated in FIG. 7.

With the workpiece W engaged with the locating pin 74, the floating tool assembly 28 is urged laterally, freely floating, as the tapered end 76 of the locating pin 74 engages the workpiece W, said another way, engagement of the hole H by the locating pin 74 enables the floating tool assembly 28 to freely move and "find" the center of the hole H. This ensures that the punch 92 will be precisely aligned with the hole, preventing any misalignment of the push-in fastener F during insertion by the punch 92 into the hole.

Floating tool assembly 28 drift should be negligible while unlocked and the homing assembly (e.g., tapered body and hole 70, 72) is disengaged from the home position. The floating tool assembly 28 needs to be free of force that would cause such movement. Examples of force are gravity and excessive force transmitted or applied by hoses and wires. Floating tool assembly 28 should move freely enough that, when unlocked, a light force acting on the side of the locating pin 74 (i.e., tapered end 76 engaging hole H) will move the floating tool assembly 28 into alignment with the workpiece W hole H; and, such that the homing assembly 60 (e.g., tapered body 70) can consistently return the floating tool assembly 28 to its home position when it engages the home position guide (e.g., tapered hole 72).

The workpiece W should be stiff enough to apply force to move the floating tool assembly 28 with minimal distortion, so the workpiece hole H does not move out of alignment when the locating pin 72 is withdrawn. The robot 12 maintains the desired workpiece position between the time the locating pin 72 is withdrawn, and the fastener F is inserted. Orientation and engagement of the push-in fastener F must be sufficiently controllable within the limits required by the lead incorporated into the fastener design. Fasteners with a lot of taper lead will find and start insertion into the hole easier, so they require less holding and locating precision.

Now that the floating tool assembly 28 has been centered and aligned to the desired working position, which corresponds to the position in which the workpiece W has been arranged by the robot 12 and held for insertion of the push-in fastener, the floating tool assembly 28 is locked (block 210) by the brake assembly 56 (from position shown in FIG. 4A to position shown in FIG. 4B). At this point, the locating pin 74 can be retracted (block 212) and the punch 92 (along with the locating pin 74, which is also operatively supported by the slide plate 46) is slid from the first position to the second position (block 214), as shown in FIG. 10. In this position, the punch 92 and its supported fastener F is aligned with the hole H in the workpiece W that is arranged in the desired workpiece position. The punch 92 is advanced to engage the workpiece and insert the fastener F into the hole H (block 216; FIG. 11). The punch 92 is then retracted, and the workpiece W removed by the robot 12. The floating tool assembly 28 can be unlocked (block 218) and the process repeated for the next fastener insertion.

The disclosed fastener insertion tool 14 does not require pre-established precision alignment of the fastener installation tooling and the workpiece hole location. The floating tool assembly 28 applies any final alignment adjustment necessary during the fastener insertion cycle, making it very tolerant of issues that could otherwise impact the reliability and consistency of the insertion process. Some common causes of misalignment between the fastener installation tooling and the workpiece hole in production are: robot position programming error, robot position deviations, workpiece variation, and workpiece position variation. The robot may be programmed to an erroneous target installation position because, for example, the robot is taught using a random production workpiece sample which does not represent the nominal hole location, or the robot programmer may not be able to devote sufficient time to teach the optimum installation positions. The consistency and repeatability of robot end effector positioning may be affected by accumulated robot axis position errors, which may vary depending on the robot reach and travel speed (i.e., low speed travel versus high speed operation). Workpiece variations may be caused by stamping locator tolerances, tool wear, and workpiece shape changes, such as due to spring back. Workpiece position variation may also be caused by accumulated tolerances or gaging clearances.

The practical simplicity of the floating tool assembly 28 eliminates the considerable time and skill required to teach and maintain the robot programming. The reduced possibility of configuration error minimizes the occurrence of damaged fasteners or workpieces due to the application of insertion force when the fastener is not properly aligned with the workpiece hole. The tooling to locate the workpiece does not need to precisely locate and secure the workpiece to establish the insertion hole location. A simple tool to hold and roughly locate the workpiece is less expensive to construct and maintain than a complex workpiece fixture, frequently lighter than moving the insertion tool-especially if the workpiece is not stiff enough to resist the insertion force so an anvil is required, and provides considerable flexibility to design a robot end effector providing access on many sides and planes of the workpiece.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of installing a push-in fastener comprising the steps of:
   homing a floating tool assembly to a home position, the floating tool assembly carrying a locating pin and a punch;
   releasing the floating tool assembly;
   positioning a workpiece at a target position;
   retrieving a fastener with the punch;
   engaging the workpiece with the locating pin causing the floating tool assembly to move to a desired working position with respect to the workpiece;
   locking the floating tool assembly in the desired working position;
   retracting the locating pin; and
   advancing the punch to install the fastener in the workpiece.

2. The method of claim 1, wherein the floating tool assembly includes a first plate, the homing step includes locking a first plate to a fixed structure, and the releasing step includes unlocking the first plate from the fixed structure.

3. The method of claim 1, wherein positioning step includes moving a workpiece beneath floating tool assembly with a multi-axis robot, the home position corresponding to a hole in the workpiece being arranged in alignment with the locating pin.

4. The method of claim 3, wherein the floating tool assembly includes a slide assembly supporting the locating pin and the punch, the retrieving step includes advancing the punch to pick up a fastener from a chute with the slide in a first position.

5. The method of claim 4, wherein the engaging step includes advancing the locating pin to engage the hole with the slide assembly in the first position which causes the floating tool assembly to move laterally relative to a fixed structure to a centered position offset from the home position corresponding to the desired working position.

6. The method of claim 5, wherein the engaging step is performed prior to the retrieving step.

7. The method of claim 5, wherein the locking step includes actuating a brake assembly, the locking step includes locking a first plate to the fixed structure in the centered position.

8. The method of claim 7, comprising the step of moving the slide assembly from the first position to a second position, the moving step performed between the locating pin retracting step and the punch advancing step.

9. The method of claim 8, wherein the advancing step inserts the fastener into the hole previously engaged by the locating pin.

10. The method of claim 9, comprising the step of unlocking the floating tool assembly and performing the homing step in preparation for another push-in fastener installation.

11. A fastener insertion tool for inserting a push-in fastener into a hole in a workpiece, comprising:
   a fixed structure;
   a floating tool assembly movably supported on the fixed structure and configured to move between a home position and a desired working position;
   a homing assembly configured to locate the floating assembly relative to the fixed structure in the home position;
   a brake assembly configured to move between locked and unlocked positions, the floating tool assembly permitted to move relative to the fixed structure in the locked position, and the floating tool assembly affixed to the fixed structure in the locked position with the floating tool assembly in the desired working position; and
   a slide assembly movable between first and second positions, the slide assembly supporting:
      a locating pin movable between retracted and extended positions, the extended position corresponding to the locating pin being received in the hole in the workpiece with the slide assembly in the first position, the locating pin being received in the hole urges the floating assembly to move to the desired working position; and a punch movable between retracted and extended positions, the punch configured to support the push-in fastener, the extended position corresponding to the push-in fastener being received in the hole in the workpiece with the slide assembly in the second position.

12. The fastener insertion tool of claim 11, comprising a pair of spaced apart linkages interconnecting the floating tool assembly to the fixed structure, the linkages configured to permit the floating tool assembly to freely move laterally in a plane between the home position and the desired workpiece position.

13. The fastener insertion tool of claim 11, wherein the homing assembly includes a homing actuator mounted on the fixed structure and configured to linearly actuate a tapered body between engagement and disengagement with a correspondingly tapered hole in the floating tool assembly.

14. The fastener insertion tool of claim 11, wherein the brake assembly includes a brake actuator mounted on the fixed structure and configured to linearly actuate a puck between engagement and disengagement with a friction surface on the floating tool assembly.

15. The fastener insertion tool of claim 11, wherein the slide assembly includes a set of rails and a slide plate slidably supported on the rails for movement between the first and second positions.

16. The fastener insertion tool of claim 15, comprising a locating pin actuator configured to linearly move the pin between the extended and retracted positions, the locating pin actuator mounted on the slide plate.

17. The fastener insertion tool of claim 15, comprising a punch actuator configured to linearly move the punch between a loading position and the extended and retracted positions, the punch actuator mounted on the slide plate, the loading position corresponding to the punch picking up the push-in fastener from a chute.

18. The fastener insertion tool of claim 11, wherein the locating pin has a tapered end configured to urge the floating tool assembly to move laterally to a centered position with respect to the hole in response to the tapered end sliding along the periphery of the hole.

19. A fastener insertion cell including the fastener insertion tool of claim 11, the fastener insertion cell comprising:

a multi-axis robot configured to move a workpiece to a target position;

a first conveyor configured to provide the workpiece to the robot;

a second conveyor configured to receive the workpiece from the robot subsequent to insertion of the push-in fastener into the hole; and a vibratory tumbler configured to feed push-in fasteners to the punch via a chute.

20. The fastener insertion tool of claim 19, wherein the robot maintains the workpiece in the target position as the locating pin engages the hole, causing a lateral reaction force moving the floating tool assembly to a centered position in which the punch is subsequently aligned with the hole in the desired workpiece position.

* * * * *